US009838829B2

United States Patent
El-Hoiydi (10) Patent No.: US 9,838,829 B2
(45) Date of Patent: Dec. 5, 2017

(54) WIRELESS STREAMING OF AN AUDIO SIGNAL TO MULTIPLE AUDIO RECEIVER DEVICES

(71) Applicant: Phonak AG, Stäfa (CH)

(72) Inventor: Amre El-Hoiydi, Neuchâtel (CH)

(73) Assignee: Sonova AG, Stäfa (CH)

( * ) Notice: Subject to any disclaimer, the term of this patent is extended or adjusted under 35 U.S.C. 154(b) by 0 days.

(21) Appl. No.: 14/647,896

(22) PCT Filed: Dec. 3, 2012

(86) PCT No.: PCT/EP2012/074235
§ 371 (c)(1),
(2) Date: May 28, 2015

(87) PCT Pub. No.: WO2014/086388
PCT Pub. Date: Jun. 12, 2014

(65) Prior Publication Data
US 2015/0319557 A1   Nov. 5, 2015

(51) Int. Cl.
| H04B 7/00 | (2006.01) |
| H04W 4/00 | (2009.01) |
| H04W 56/00 | (2009.01) |
| H04R 25/00 | (2006.01) |
| H04L 1/08 | (2006.01) |
| H04L 1/16 | (2006.01) |
(Continued)

(52) U.S. Cl.
CPC .............. *H04W 4/008* (2013.01); *H04L 1/08* (2013.01); *H04L 1/1657* (2013.01); *H04R 25/552* (2013.01); *H04R 25/556* (2013.01); *H04W 4/003* (2013.01); *H04W 56/001* (2013.01); *H04W 84/18* (2013.01); *H04W 88/02* (2013.01); *H04W 88/16* (2013.01)

(58) Field of Classification Search
CPC . H04W 4/008; H04W 56/001; H04W 56/003; H04R 25/552
USPC ... 455/41.1–41.3, 575.1, 575.2, 575.6, 550.1
See application file for complete search history.

(56) References Cited

U.S. PATENT DOCUMENTS 8,041,066 B2   10/2011   Solum
8,155,335 B2   4/2012   Rutschman
(Continued)

FOREIGN PATENT DOCUMENTS

EP   2 403 277 A1   1/2012

*Primary Examiner* — Nay A Maung
*Assistant Examiner* — Angelica M Perez (57) ABSTRACT

A method of streaming an audio signal from an audio transmission device to first and second audio receiver devices via a Bluetooth link using a protocol that requires an audio data packet to be retransmitted if a positive packet receipt is not received. The first audio receiver device is synchronized to the audio transmission device to enable the first audio receiver device to receive an audio signal stream from the audio transmission device, the second audio receiver device is synchronized to the audio transmission device to enable the second audio receiver device to eavesdrop the audio signal stream to the first audio receiver device. When a positive packet receipt acknowledgement is not transmitted from the first audio receiver device to the audio transmission device, the audio transmission device repeats transmission of that audio data packet irrespective of whether the packet has been correctly received by the first audio receiver device.

16 Claims, 5 Drawing Sheets

(51) Int. Cl.
  *H04W 88/02* (2009.01)
  *H04W 88/16* (2009.01)
  *H04W 84/18* (2009.01)

(56) References Cited

U.S. PATENT DOCUMENTS

| | | |
|---|---|---|
| 8,768,252 B2 | 7/2014 | Watson et al. |
| 9,002,044 B2 | 4/2015 | Dinescu et al. |
| 2005/0037823 A1 | 2/2005 | Seshadri et al. |
| 2007/0037615 A1 | 2/2007 | Glezerman |
| 2007/0275704 A1 | 11/2007 | Terai |
| 2008/0159548 A1* | 7/2008 | Solum ................ H04R 25/552 381/58 |
| 2009/0154739 A1 | 6/2009 | Zellner |
| 2009/0232041 A1* | 9/2009 | Smith .................. H04L 1/1867 370/312 |
| 2011/0169654 A1 | 7/2011 | Ketari |
| 2012/0057475 A1 | 3/2012 | Wu et al. |
| 2012/0058727 A1* | 3/2012 | Cook ...................... H04R 5/02 455/41.3 |
| 2012/0171958 A1 | 7/2012 | Cornett et al. |
| 2012/0218979 A1 | 8/2012 | Yeh et al. |
| 2014/0056451 A1* | 2/2014 | El-Hoiydi ........... H04R 25/554 381/315 |

* cited by examiner

FIG. 7

WIRELESS STREAMING OF AN AUDIO SIGNAL TO MULTIPLE AUDIO RECEIVER DEVICES

BACKGROUND OF THE INVENTION

Field of the Invention

The invention relates to a method and a system for streaming an audio signal from an audio transmission device to an arrangement comprising at least a first audio receiver device and a second audio receiver device via a standard Bluetooth link; the first audio receiver device may be a hearing aid worn at one ear of a user and the second audio receiver device may be a hearing aid worn at the other ear of the user, and the audio transmission device may be a mobile phone.

Description of Related Art

Typically, hearing aids are connected to mobile phones by using a Bluetooth link, since the Bluetooth standard is the only standard currently available on all mobile phones for providing speech and music connectivity (this applies currently to "Bluetooth Classic", but not to "Bluetooth Low Energy" which is presently not available on all mobile phones and which is presently not providing audio connectivity).

The Bluetooth profiles suitable for audio transmission, such as the "headset profile", the "hands-free profile" and the "A2DP profile", are designed to audio data transport between two devices only, i.e., they are designed for a point-to-point link. Hence these profiles cannot be used to connect one audio source with two audio sinks. Although it is technically feasible to change the Bluetooth standard in a manner so as to provide a connectivity between one audio source and several audio sinks, such modification usually is not desirable for practical reasons.

U.S. Patent Application Publication 2012/0058727 A1 and corresponding U.S. Pat. No. 8,769,252 B2 relate to a system wherein a Bluetooth audio source is connected via a standard Bluetooth link to a first loudspeaker for transmitting an audio signal to the first loudspeaker, and wherein a wireless link between the first loudspeaker and a second loudspeaker is used for transmitting information to the second loudspeaker enabling the second loudspeaker to eavesdrop the Bluetooth link between the audio source and the first loudspeaker in order to also receive the audio signals transmitted to the first loudspeaker. The first loudspeaker is also used for handling acknowledgement of audio packet reception by the second loudspeaker: either the first loudspeaker transmits missing packets, i.e., packets not received by the second loudspeaker, to the second loudspeaker, or the first loudspeaker asks the audio source for a retransmission of missing packets, with the wireless link from the second loudspeaker to the first loudspeaker being used to inform the first loudspeaker that the second loudspeaker has missed a packet. According to an alternative embodiment, the first loudspeaker is used for forwarding the audio data received from the audio source to the second loudspeaker via the wireless link between the first and second loudspeaker.

U.S. Patent Application Publication 2005/0037823 A1 relates to a headset comprising a microphone having a Bluetooth transmitter and an earpiece having a Bluetooth receiver, wherein the microphone and the earpiece may be connected together physically such that the earpiece can receive synchronization information from a mobile phone and provide this to the microphone. The microphone is then disconnected and both the earpiece and the microphone communicate wirelessly with the mobile phone.

U.S. Patent Application Publication 2007/0037615 A1 relates to a system comprising a right ear headset and a left ear headset which are designed such that audio signals received by one of the headsets from a mobile phone are forwarded to the other headset by using a protocol which is different to the protocol used by the mobile phone.

U.S. Patent Application Publication 2008/0226094 A1 and corresponding U.S. Pat. No. 8,155,335 B2 relate to a headset comprising two earpieces, wherein the wireless link between the earpieces is used for forwarding audio data received by one of the earpieces from an audio source. The headset is also designed to synchronize audio output at the two earpieces.

U.S. Patent Application Publication 2012/0230510 A1 and corresponding U.S. Pat. No. 9,002,044 B2 relate to a similar headset, wherein one of the earpieces receives audio data from an audio source via a wireless link and forwards such audio data to the second earpiece. In addition, information concerning audio synchronization is sent from the first earpiece to the second earpiece. A connection oriented protocol is used for forwarding audio data, and a connectionless protocol is used for sending synchronization data.

All of the above prior art systems require a wireless link between the two audio sinks in order to either forward the audio signal received by the first sink to the second sink or to exchange information between the two sinks in order to enable the second sink to eavesdrop the link between the audio source and the first sink. However, the provision of a wireless link between the two audio receiving devices may be undesirable for several reasons. For example, either a second antenna may be required for establishing the wireless link between the audio receivers, or the antenna used for communication with the audio source has to be multiplexed which may incur problematic constraints. Further, the transmission of acknowledgements from the second audio receiver to the first audio receiver which communicates with the audio source may be time-critical. Also, forwarding audio data from the first receiver to the second receiver requires additional current consumption on the first receiver, which may be critical in case of ear level devices. Finally, when using an RF transmission at 2.4 GHz, it is challenging to achieve a binaural link because radio signals at this frequency cannot propagate through the head.

SUMMARY OF THE INVENTION

It is an object of the invention to provide for a method for streaming an audio signal from an audio transmission device to an arrangement comprising at least a first audio receiver device and a second audio receiver device via a standard Bluetooth link, wherein the use of an additional wireless link between the audio receiver devices is avoided as far as possible while achieving reliable audio signal receipt by both audio receivers.

According to the invention, these objects are achieved by methods and corresponding systems as described herein.

The invention is beneficial in that the need to use a wireless link between the two audio receiver devices is eliminated or at least minimized, while nevertheless audio packet loss is minimized.

According to an aspect of the invention, the need for a wireless link between the first and second audio receiver device for handling packet receipt acknowledgement is eliminated by using a standard Bluetooth protocol requiring repetition of transmission of an audio data packet in case of a missing positive packet receipt acknowledgement and by preventing the first audio receiver device, at least in some cases, from transmitting a positive packet receipt acknowledgement to the audio transmission device after having correctly received an audio data packet, thereby causing the audio transmission device to repeat transmission of each audio data packet irrespective of whether the packet has been correctly received by the first audio receiver device. Such repeated transmission increases the likelihood that an audio data packet is correctly received by the second audio receiver device, without the need to transmit an acknowledgement from the second audio receiver device and without the need to modify the Bluetooth protocol.

According to another aspect of the invention, the above benefit is achieved by the causing the second audio receiver device to transmit a jamming signal during at least part of the duration of the transmission of a positive packet receipt acknowledgement by the first audio receiver device if an audio data packet has not correctly received by the second audio receiver device in order to prevent the audio transmission device from receiving a positive packet receipt acknowledgement, thereby causing the audio transmission device to repeat transmission of the audio data packet irrespective of whether the packet has been correctly received by the first audio receiver device. Repeated audio data packet transmission for the second audio receiver device is achieved without the need to modify the Bluetooth protocol and without the need to send a packet receipt acknowledgement from the second receiver device to the first audio receiver device.

According to a further aspect of the invention the above benefit is achieved by establishing an ACL (asynchronous connection oriented logical link) connection between the audio transmission device and the second audio receiver device in order to achieve synchronization of second audio receiver device with the audio transmission device, thereby enabling the second audio receiver device to eavesdrop the audio signal stream from the audio transmission device to the first audio receiver device. Thus the need for a wireless connection between the two audio receiver devices for transmitting synchronization information to the second audio receiver device is eliminated. Further, such ACL connection may also be used for providing the second audio receiver device with the security key used by the audio transmission protocols for encrypting the audio data.

Preferably, the Bluetooth link uses Bluetooth Classic; however the invention is also useful for any Bluetooth point-to-point link.

Hereinafter, examples of the invention will be illustrated by reference to the accompanying drawings.

DETAILED DESCRIPTION OF THE INVENTION

Figure 1:
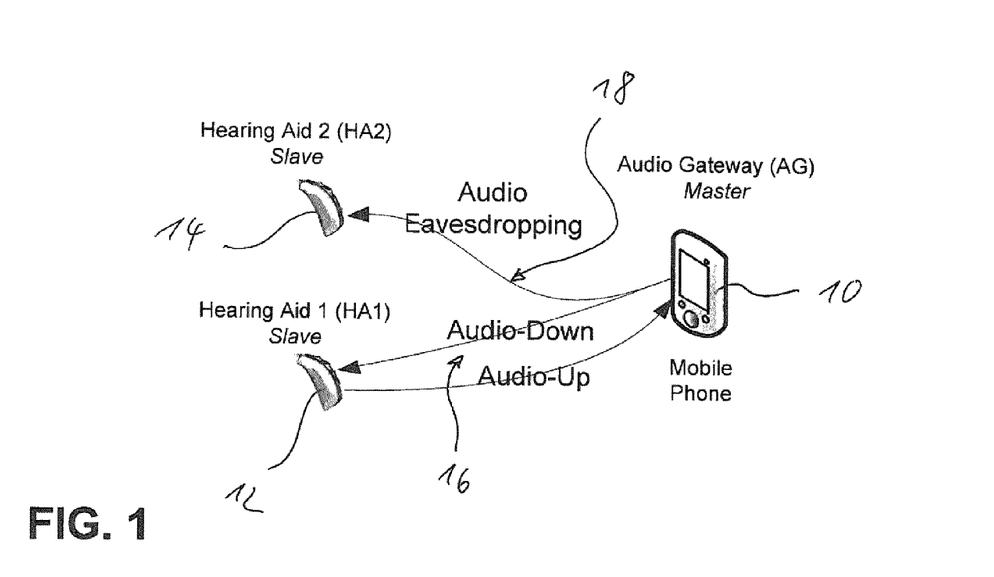
FIG. 1 is a schematic illustration of an example of audio streaming from a mobile phone two hearing aids according to the invention.

FIG. 1 illustrates a first example of a system for streaming an audio signal from an audio transmission device to a first audio receiver device and a second audio receiver device, wherein the audio transmission device is a mobile phone 10 and the audio receiver devices are hearing aids 12, 14 to be worn at both ears of a user. The first hearing aid 12 is connected to the mobile phone 10 via a non-modified standard Bluetooth Classic link 16 wherein the Bluetooth link preferably uses an eSCO protocol, an A2DP profile, a headset profile or a hands-free profile for transmitting audio data from the mobile phone 10 to the first hearing aid 12. The audio protocol/profile requires repetition of transmission of an audio data packet in case of a missing positive packet receipt acknowledgement from the receiver device.

In order to establish a Bluetooth audio link, the mobile phone 10 and the first hearing aid 12 are paired and synchronized in the usual manner. Such pairing and synchronization requires that the first hearing aid 12, which acts as a slave, is provided during pairing and connection setup procedures with pairing and synchronization information concerning the device ID, the frequency hopping sequence, the encryption key used for encrypting the audio data and the clock used by the mobile phone 10, which acts as the master of the Bluetooth connection. After having been synchronized to the mobile phone 10, the first hearing aid 12 can receive an audio signal stream from the mobile phone 10.

Since the available Bluetooth audio protocols/profiles are designed for a point-to-point connection only, it is not possible to pair and synchronize the second hearing aid 14 to the mobile phone 10 in the same manner as the first hearing aid 12. However, if the second hearing aid 14 is provided with the necessary synchronization information (including the audio encryption key) which has been provided to the first hearing aid 12, the second hearing aid 14 may eavesdrop the audio stream 16 from the mobile phone 10 to the first hearing aid 12 (this "eavesdropping audio stream" is designated by 18 in FIG. 1).

However, since the second hearing aid 14 does not participate in the audio link 16 with the mobile phone 10, the second hearing aid 14 cannot send messages to the mobile phone 10, such as acknowledgement packets so that the second hearing aid 14 cannot inform the mobile phone 10 that it did not correctly receive a certain audio packet and hence needs retransmission of the packet. Hence, if the first hearing aid 12 has correctly received a certain audio packet, while the second hearing aid 14 did not, the mobile phone 10 usually would not repeat transmission of that packet, resulting in a packet loss at the second hearing aid 14.

Figure 2:
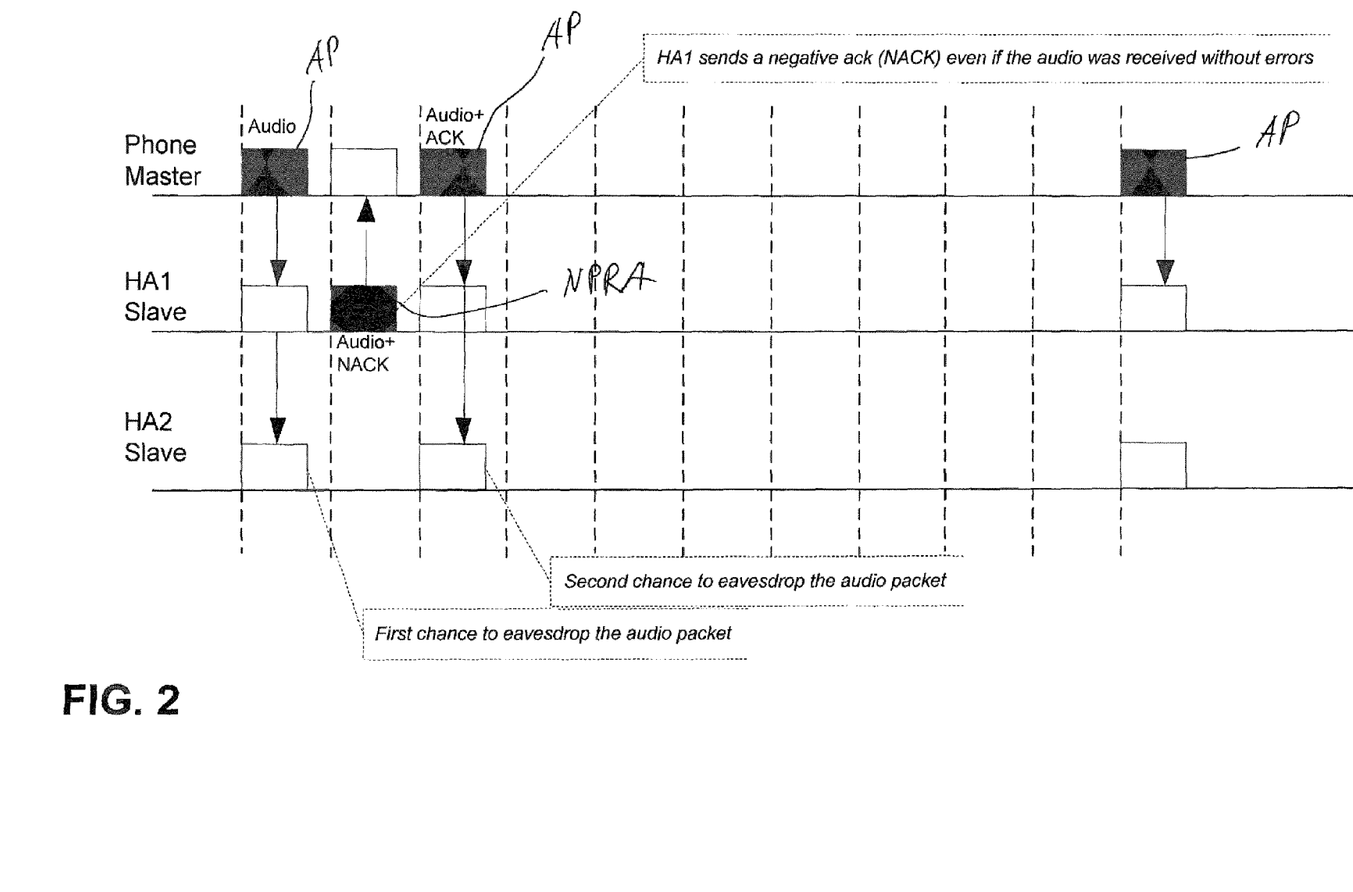
FIG. 2 is an illustration of an example of the handling of packet receipt acknowledgement in the system of FIG. 1.

A first example of how such packet loss at the second hearing aid 14 could be prevented is shown in FIG. 2. According to this embodiment, the first hearing aid 12, at least in some cases, does not transmit a positive packet receipt acknowledgement to the mobile phone 10 after having correctly received an audio data packet AP, thereby causing the mobile phone 10 to repeat transmission of the preceding audio data packet AP, irrespective of whether the packet AP has been correctly received by the first hearing aid 12 or not.

According to a first option, as shown in FIG. 2, a negative packet receipt acknowledgement NPRA may be transmitted by the first hearing aid 12 despite having correctly received the audio data packet AP, thereby causing the mobile phone 10 to repeat transmission of that audio packet AP.

According to an alternative option, the first hearing aid 12 does not transmit any packet receipt acknowledgement at all, thereby causing the mobile phone 10 to retransmit the respective audio data packet AP. This alternative option has the benefit that by not sending any acknowledgement power is saved on the first hearing aid 12.

According to one embodiment, the above measures for causing the mobile phone 10 to retransmit audio packets AP may be applied only to the first transmission of an audio data packet AP, resulting in a single repetition of the transmission of each audio packet AP. According to an alternative embodiment, such measures also could be applied to the second transmission (i.e., the first repetition) of each audio packet, thereby causing the mobile phone 10 to repeat transmission of each audio packet AP twice.

Figure 3:
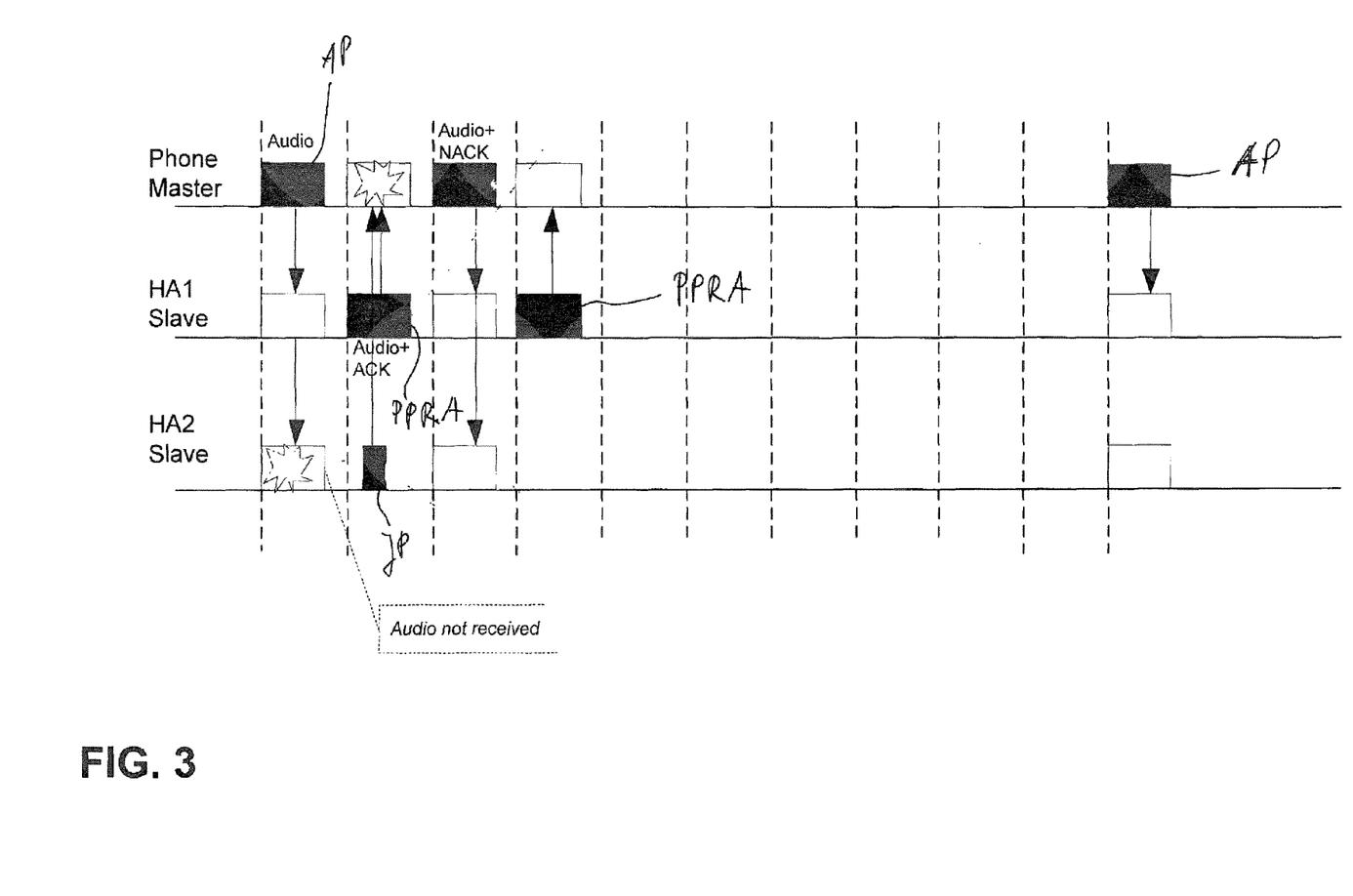
FIG. 3 is an illustration like FIG. 2, wherein an alternative example is shown.

An alternative embodiment of handling packet repetition is illustrated in FIG. 3, according to which the first hearing aid 12 may respond to correct receipt of an audio packet AP by transmitting a positive packet receipt acknowledgement PPRA, while the second hearing aid 14 transmits a jamming signal JP during at least a part of the duration of the transmission of a positive packet receipt acknowledgement PPRA by the first hearing aid 12 in order to prevent the mobile phone 10 from receiving a positive packet receipt acknowledgement, thereby causing the mobile phone 10 to repeat transmission of the audio packet AP irrespective of whether the packet has been correctly received by the first hearing aid 12. Thus, as in the case of the embodiment of FIG. 2, the second hearing aid 14 obtains a second chance to eavesdrop the audio packet AP. Preferably, the jamming signal JP is transmitted at the highest available and allowable power. For minimizing power consumption, the duration of the jamming signal should be minimized so as to cause enough bit errors to cause the packet receipt acknowledgement packet to be dropped by the mobile phone 10.

The method of FIG. 3 is based on the fact that, in case the second hearing aid 14 is provided with synchronization information necessary to eavesdrop the Bluetooth audio link, the second hearing aid 14 knows at which time and frequency the first hearing aid will transmit (positive or negative) packet receipt acknowledgements PPRA, NPRA so that the second hearing aid 14 may transmit a jamming signal having the duration of the acknowledgement packet PPRA (or NPRA). However, alternatively the second hearing aid 14 may transmit a jamming signal of a few bits duration, just enough to destroy part of the acknowledgement packet in order to prevent the acknowledgement packet PPRA (or NPRA) from being correctly received by the mobile phone 10.

For example, if the Bluetooth audio link has a packet error rate of 10%, transmitting each packet twice will bring down the error rate to 1%. With 266 audio frames being transmitted per second, error rate of 1% will cause 2.6 audio frame losses per second. With each packet being transmitted three times, the error rate would go down to 0.1%, corresponding to 0.26 frame losses per second.

Figure 4:
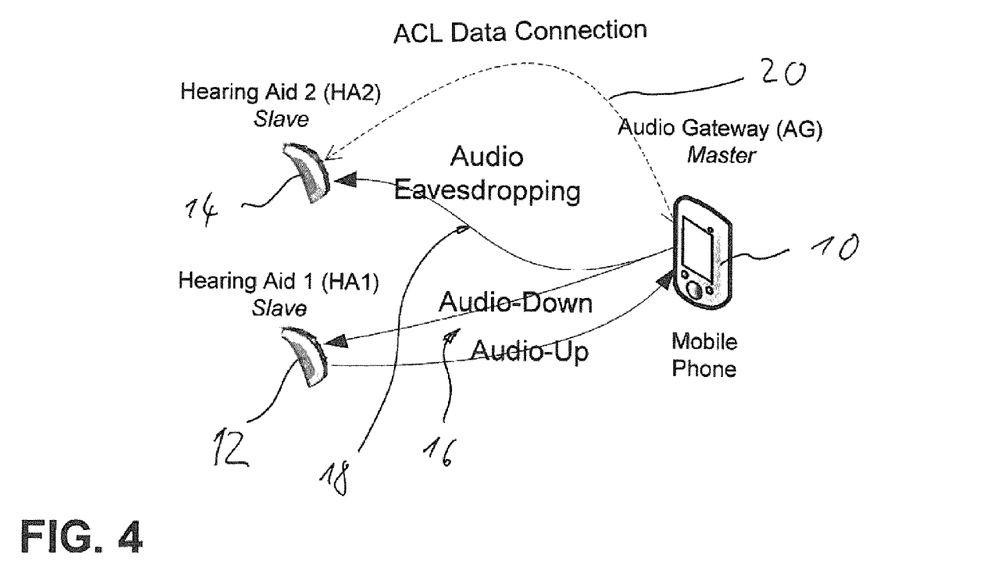
FIG. 4 is a schematic illustration of an example of how synchronization information is exchanged in the system of FIG. 1.

In FIG. 4 an example is shown of how the frequency hopping synchronization necessary for eavesdropping of the Bluetooth audio link 16 between the mobile phone 10 and the first hearing aid 12 may be achieved on the second hearing aid 14. To this end, a service level ACL connection 20 is established between the mobile phone 10 and the second hearing aid 14, wherein the second hearing aid 14 may be paired with the mobile phone 10 according to a Bluetooth profile which is allowed by the mobile phone 10 to run in parallel with the audio transmission profile/protocol used in the audio link 16 for streaming audio data to the first hearing aid 12; such profile could be a serial port profile. The serial port profile emulates a RS232 serial port wherein data can be exchanged in both directions. Since the mobile phone is using the same hopping sequence for communicating with all slaves, once the second hearing aid is synchronized to the hopping sequence of the mobile phone, it can eavesdrop the packets exchanged on the connection between the phone and the first hearing aid.

In general, any profile could be used at service level only for achieving synchronization of the second hearing aid 14 with the mobile phone 10: for example, if a Headset profile would be used between the mobile phone 10 and the second hearing aid 14, this Headset profile would not be transporting any audio data, rather it would be in an "idle" mode, so that only the ACL part of the Headset profile would be used, but not the audio part. In general, the service level ACL connection 20 between the mobile phone 10 and the second hearing aid 14 would be used only for establishing and maintaining synchronization of the second hearing aid 14 to the mobile phone 10 in order to enable the second hearing aid 14 to eavesdrop the Bluetooth audio stream 16.

In addition to being synchronized, the second hearing aid 14 typically also is provided with the security (i.e., encryption) key used in the Bluetooth audio link 16. According to a first example, the security key may be extracted from the Bluetooth processor of the mobile phone 10 and then may be transmitted via a data link from the mobile phone 10 to the second hearing aid 14. To this end, the ACL connection 20 discussed above may be used; more precisely, a profile allowing transmitting user level data, such as a Serial Port Profile, is used on the top of the ACL connection.

Figure 5:
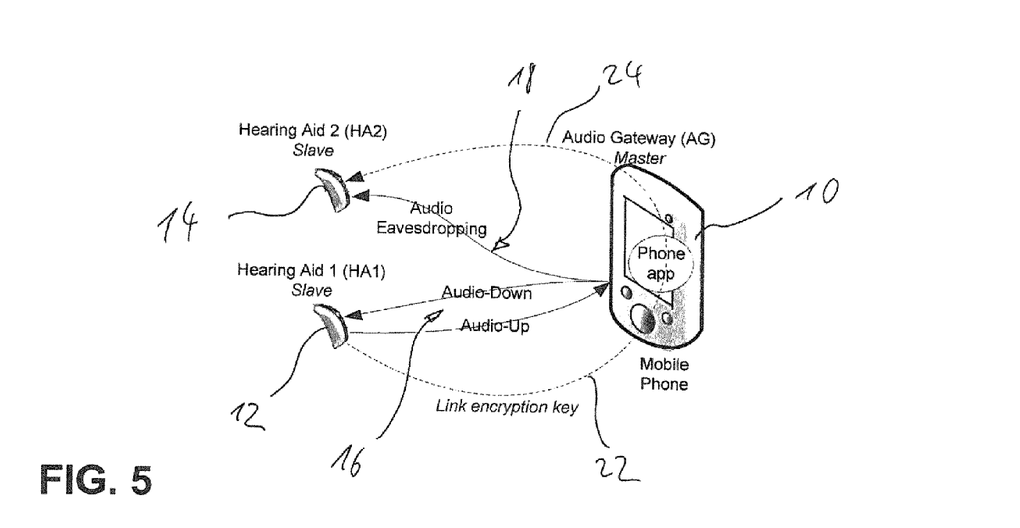
FIG. 5 is a schematic illustration of an example of how an encryption key is exchanged in the system of FIG. 1.

However, in some cases, access to the security key implemented in the Bluetooth processor may be impossible. In such cases, a process as illustrated in FIG. 5 may be used, wherein a first data link 22 is established between the first hearing aid 12 and the mobile phone 10 in order to transmit the security key from the first hearing aid 12 to the mobile phone 10. A second data link 24 is established between the mobile phone 10 and the second hearing aid 14 and is used for transmitting the security key received from the first hearing aid 12 to the second hearing aid 14. This method is preferred over the extraction of the security key from the Bluetooth processor, since it does not depend on the mobile phone hardware.

The first data link 22 and the second data link 24 may be a serial port profile transported by an ACL connection to and from the mobile phone 10. The second data link 24 may correspond to the data link 20 used in FIG. 4 for synchronization of the second hearing aid 14 to the mobile phone 10. As in the example of FIG. 4, the first and second data link 22, 24 may use a serial port profile.

In order to provide for a secure transmission of the security key, the first and second hearing aid 12, 14 may share a private key which is used for encrypting the security key prior to transmission via the first data link 22 and which is used for decrypting the security key after receipt via the second data link 24.

The methods of FIGS. 4 & 5 for synchronizing the second hearing aid 14 to the mobile phone 10 and providing the second hearing aid 14 with the security key are beneficial in that they do not require a wireless link between the first hearing 12 and the second hearing aid 14. However, the trade-off is the special software (an "app") has to be run on the mobile phone 10. Therefore, in case that a (binaural) link already exists between the first hearing aid 12 and the second hearing aid 14, it is preferable to use such link for providing the second hearing aid 14 with frequency hopping synchronization information and with the security key.

While in the examples of FIGS. 1 to 5 a mobile phone 10 was used as the audio transmission device, other audio transmission devices may be used with the present invention, such as a TV audio gateway which is used for transmitting the audio signal of a TV set to a hearing aid.

Figure 6:
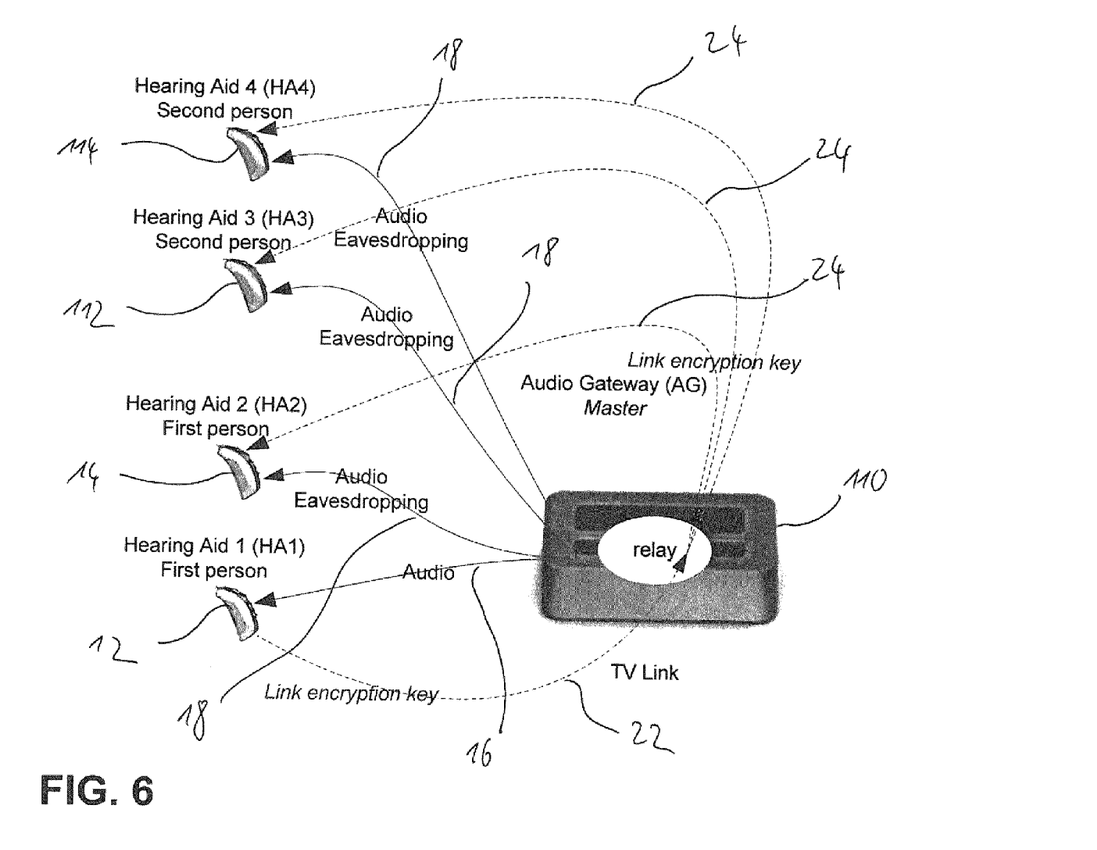
FIG. 6 is a schematic illustration of an example of a system for streaming audio signals from a TV audio gateway to a plurality of hearing aids.

An example of such application is shown in FIG. 6, wherein a TV audio gateway 110 is used for streaming an audio signal to a first hearing aid 12 via a Bluetooth audio link 16. A second hearing aid 14 may eavesdrop the audio stream of the Bluetooth link 16, as indicated at 18, by using the methods described above with regard to the mobile phone 10 of FIGS. 1 to 5. When more than one hearing impaired person uses the TV set, e.g. a second person wearing a third hearing aid 112 at one ear and a fourth hearing aid 114 at the other ear, the third and fourth hearing aid 112, 114 may act like and are treated like the second hearing aid 14 of the first person in order to likewise eavesdrop the audio signal stream 16 from the TV audio gateway 110 to the first hearing aid 12. For example, also the third and fourth hearing aid 112, 114 may be provided via an ACL data link 24 in order to establish and maintain synchronization and to be provided with the security key.

In such a system, the "jamming method" of FIG. 3 is less preferred than the method of FIG. 2, since it would not work well given the large differences in the path between the gateway 110 and the hearing aids 12, 14, 112, 114. For example, the third hearing aid 112 may be further away from the gateway 110 than the first hearing aid 12, so that the path loss is bigger towards the second hearing aid 14, and its jamming signals are likely to be too weak in power to destroy the acknowledgement packets sent by the first hearing aid.

In general this invention acts to convert a standard Bluetooth point-to-point audio transmission link into a robust broadcast link that can be received by a potentially unlimited number of receivers. There is no general limitation in the number of persons that can receive audio from a mobile phone or TV transmitter, provided that they can achieve and maintain synchronization with the audio transmitter and that they can obtain the encryption key. The number of potential receivers is potentially only limited by the scheme that is used to achieve and maintain synchronization and to transmit encryption keys.

Figure 7:
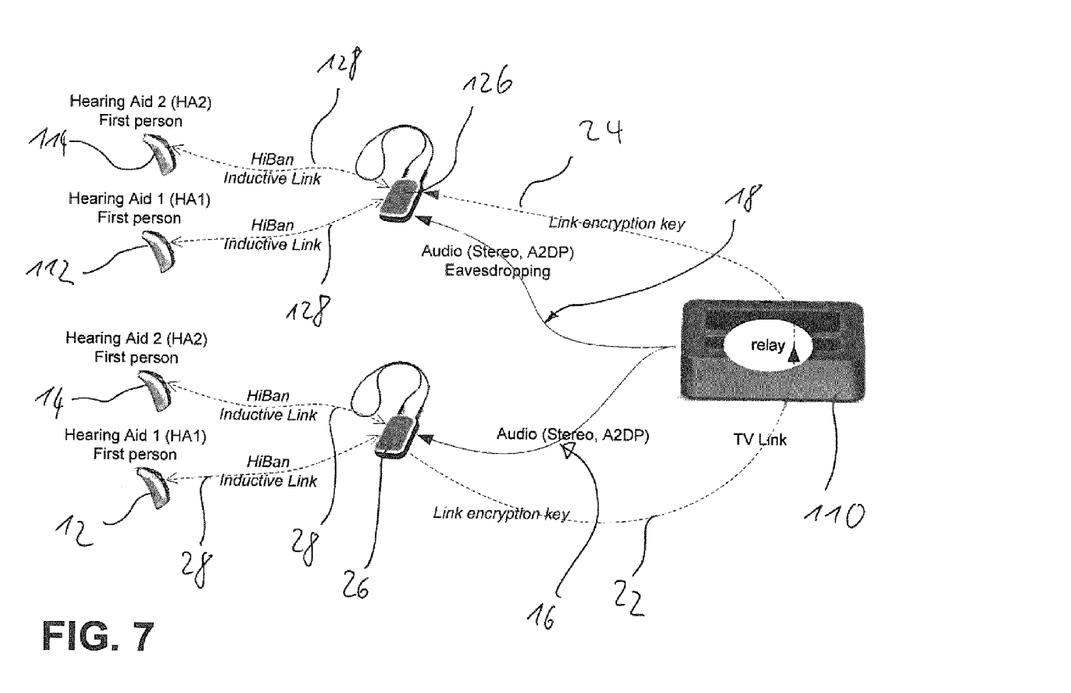
FIG. 7 shows a modification of the system of FIG. 6, wherein an audio hub is provided for each pair of hearing aids.

A modification of the system of FIG. 6 is shown in FIG. 7, wherein each person is provided with an audio hub 26, 126 which is used for audio signal reception from an external audio source, such as a TV audio gateway 110. In such system, the hubs 26, 126 take the role of the first hearing aid 12 and the second hearing aid 14, respectively, of the embodiments of FIGS. 1 to 5: the first audio hub 26 worn by the first person is provided with an audio stream via a Bluetooth audio link 16 from the gateway 110, while the second audio hub 126 is provided with synchronization information enabling the second audio hub 126 to eavesdrop the Bluetooth audio link 16. The data link 22 is used for transmitting the security key from the first audio hub 26 to the gateway 110, and the second data link 24 is used for establishing and maintaining synchronization of the second audio hub 126 and to provide it with the security key.

The first and second audio hub 26, 126 use an inductive link 28, 128 for transmitting/forwarding the received audio signal to the respective hearing aids 12, 14 and 112, 114, respectively.

What is claimed is:

1. A method for streaming an audio signal, the method comprising:
   synchronizing a first audio receiver device to an audio transmission device to enable the first audio receiver device to receive an audio signal stream from the audio transmission device, wherein the synchronizing includes using a Bluetooth link, and wherein the Bluetooth link includes repeating transmission of an audio data packet when failing to receive a positive packet acknowledgement;
   establishing a time synchronization connection between a second audio receiver device and the Bluetooth link to enable the second audio receiver device to eavesdrop the audio signal stream from the audio transmission device to the first audio receiver device without establishing a Bluetooth link between the second audio receiver device and the audio transmission device,
   wherein the first audio receiver device is configured to omit transmitting a positive packet acknowledgement to the audio transmission device after correctly receiving an audio data packet, thereby causing the audio transmission device to repeat transmission of the audio data packet irrespective of whether the audio data packet has been correctly received by the first audio receiver device, and wherein the second audio receiver device is configured to omit sending a packet acknowledgement associated with receiving the audio data packet to the first audio receiver device.

2. The method of claim 1, wherein the first audio receiver device is configured to transmit a negative packet acknowledgement after having correctly received the audio data packet, wherein the negative packet at least partially indicates the audio data packet was not received by the first audio receiver device.

3. The method of claim 1, wherein the first audio receiver device is further configured to omit transmitting any packet receipt after having correctly received an audio data packet.

4. The method according to claim 1, wherein the first audio receiver device is configured to omit transmitting another packet acknowledgement to the audio transmission device after having correctly received another transmission of the audio data packet.

5. The method according to claim 1, wherein the audio transmission device is a master and the first audio receiver device is a slave.

6. The method according to claim 1, wherein the audio data transmission device is configured to use at least one of the following: an enhanced synchronous Connection-Oriented (eSCO) protocol, an Advanced Audio Distribution Profile (A2DP), a Headset profile, and a Hands-Free profile.

7. The method according to claim 1, wherein the first and second audio receiver devices are hearing aids worn by a person at one of the ear.

8. The method according to claim 1, wherein the audio transmission device is a mobile phone.

9. The method according to claim 1, wherein the audio transmission device is a TV audio gateway.

10. The method according to claim 1, wherein the first and second audio receiver devices are first and second hearing aids worn by a person at one of the ears; and wherein the method includes communicating with third and fourth hearing aids which are worn by another person at each of the ears and which act like and are treated like the second hearing aid to eavesdrop the audio signal stream from the audio transmission device to the first hearing aid.

11. The method of claim 1, wherein the first audio receiver device is a first audio hub worn by a first person and the second audio receiver device is a second audio hub worn by a second person, wherein the first audio hub transmits the received audio signal to a first hearing aid worn by the first person and the second audio hub transmits the received audio signal a second hearing aid worn by the second person, and wherein the first and second audio hubs use an inductive link for transmitting the received audio signal to the respective at the first and second hearing aids.

12. A system for streaming an audio signal from an audio transmission device, the system comprising:
a first audio receiver device configured to communicate with an audio transmission device and configured to establish a Bluetooth link with the audio transmission device,
wherein the Bluetooth link includes a protocol requiring repetition of transmission of an audio data packet in case of a missing positive packet acknowledgement, and
wherein the first audio receiver device and the audio transmission device are configured to synchronize the first audio receiver device to the audio transmission device to enable the first audio receiver device to receive an audio signal stream from the audio transmission device;
a second audio receiver device configured to establish a time synchronization with the first audio receiver device to enable the second audio receiver device to eavesdrop on the Bluetooth link between the first audio receiver device and the audio transmission device without establishing a Bluetooth link with the audio transmission device,
wherein the first audio receiver device is configured to omit transmitting positive packet acknowledgement to the audio transmission device after correctly receiving an audio data packet, thereby causing the audio transmission device to repeat transmission of each audio data packet irrespective of whether the audio data packet has been correctly received by the first audio receiver device, and wherein the second audio receiver is configured to omit sending a packet acknowledgement associated with receiving the audio data packet to the first audio receiver device.

13. A non-transitory computer-readable medium storing instructions that when executed by a processor, cause a system to perform operations for streaming an audio signal, the operations comprising: receive, at a first device, a link synchronization request from a second device to enable the second device to receive an audio signal stream from the first device, wherein the link synchronization request causes the first device and the second device to engage in a communication protocol for streaming the audio signal stream;
establish a time synchronizing between a third device and the second device to enable the third device to eavesdrop the audio signal stream without engaging the communication protocol for streaming the audio signal stream;
send, via the communication protocol, an audio data packet from the first device to the second device;
determine that the second device failed to send a positive packet acknowledgment based on receiving a negative packet acknowledgment after correctly transmitting the audio data packet;
repeat transmission of the audio data packet in response to determining that the second device failed to send the positive packet acknowledgment; and
receive, at the third device, the repeated transmission of the audio data packet,
wherein the third device is configured to operate without sending a packet acknowledgement of the audio data packet to the first device.

14. The non-transitory computer-readable medium of claim 13, wherein the second and third devices are hearing aids.

15. The non-transitory computer-readable medium of claim 13, wherein the operations further comprise:
establish service level asynchronous connection-less (AU) connection between an audio transmission device and the second device to maintain synchronization of the second device with the audio transmission device.

16. The non-transitory computer-readable medium of claim 13, wherein the communication protocol is Bluetooth.

* * * * *